United States Patent
Priyadarshi et al.

(10) Patent No.: US 10,747,953 B1
(45) Date of Patent: Aug. 18, 2020

(54) SYSTEMS AND METHODS FOR AUTOMATICALLY CREATING A PATENT APPLICATION BASED ON A CLAIM SET SUCH THAT THE PATENT APPLICATION FOLLOWS A DOCUMENT PLAN INFERRED FROM AN EXAMPLE DOCUMENT

(71) Applicant: Specifio, Inc., Los Angeles, CA (US)

(72) Inventors: Jay Priyadarshi, Los Angeles, CA (US); Ian C. Schick, Hermosa Beach, CA (US); Xing Shi, Playa Vista, CA (US); Kevin Knight, Marina Del Rey, CA (US)

(73) Assignee: SPECIFIO, INC., Marina Del Rey, CA (US)

( * ) Notice: Subject to any disclaimer, the term of this patent is extended or adjusted under 35 U.S.C. 154(b) by 143 days.

(21) Appl. No.: 16/025,687

(22) Filed: Jul. 2, 2018

Related U.S. Application Data

(60) Provisional application No. 62/528,907, filed on Jul. 5, 2017, provisional application No. 62/534,793, filed
(Continued)

(51) Int. Cl.
*G06F 40/103* (2020.01)
*G06F 40/279* (2020.01)
(Continued)

(52) U.S. Cl.
CPC .......... *G06F 40/279* (2020.01); *G06F 40/103* (2020.01); *G06F 40/258* (2020.01); *G06F 40/263* (2020.01)

(58) Field of Classification Search
None
See application file for complete search history.

(56) References Cited

U.S. PATENT DOCUMENTS 6,014,663 A   1/2000  Rivette
6,049,811 A * 4/2000  Petruzzi ................. G06F 17/24
                                                     715/255
(Continued)

OTHER PUBLICATIONS

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.
(Continued)

*Primary Examiner* — Abul K Azad
(74) *Attorney, Agent, or Firm* — Esplin & Associates, PC

(57) ABSTRACT

Systems and methods for automatically creating a patent application based on a claim set such that the patent application follows a document plan inferred from an example document are disclosed. Exemplary implementations may: obtain one or more example documents, a given example document including a patent document; identify common formatting features among the one or more example documents; determine a document plan for a patent application based on information gained from the one or more example documents; receive one or more previously unseen patent claims; and use computerized natural language generation to automatically create a new patent application based on both the document plan and the one or more patent claims such that the new patent application reflects subject matter of the one or more patent claims and is otherwise consistent with the one or more example documents.

18 Claims, 2 Drawing Sheets

Related U.S. Application Data on Jul. 20, 2017, provisional application No. 62/539,014, filed on Jul. 31, 2017, provisional application No. 62/561,876, filed on Sep. 22, 2017, provisional application No. 62/564,210, filed on Sep. 27, 2017.

(51) Int. Cl.
*G06F 40/258* (2020.01)
*G06F 40/263* (2020.01)

(56) References Cited

U.S. PATENT DOCUMENTS

| | | |
|---|---|---|
| 6,434,580 B1 | 8/2002 | Takano |
| 8,041,739 B2 | 10/2011 | Glasgow |
| 8,843,821 B2 | 9/2014 | Tran |
| 9,195,647 B1 | 11/2015 | Zhang |
| 9,542,360 B2 | 1/2017 | Tran |
| 9,600,566 B2 | 3/2017 | Ganti |
| 9,836,805 B2 | 12/2017 | Rau |
| 9,906,515 B1 | 2/2018 | Tillman |
| 9,990,351 B2 | 6/2018 | Tran |
| 10,242,066 B2 | 3/2019 | Lundberg |
| 10,417,341 B2 * | 9/2019 | Schick ............... G06F 17/2785 |
| 2001/0049707 A1 | 12/2001 | Tran |
| 2003/0065637 A1 * | 4/2003 | Glasgow ............... G06Q 10/10 |
| 2005/0144177 A1 * | 6/2005 | Hodes ............... G06F 17/27 |
| 2005/0261891 A1 | 11/2005 | Chan |
| 2006/0190807 A1 | 8/2006 | Tran |
| 2007/0174039 A1 | 7/2007 | Lin |
| 2008/0147656 A1 | 6/2008 | Kahn |
| 2008/0281860 A1 | 11/2008 | Elias |
| 2008/0313528 A1 * | 12/2008 | Chang ............... G06Q 10/10 715/200 |
| 2010/0257089 A1 | 10/2010 | Johnson |
| 2012/0101803 A1 | 4/2012 | Popov |
| 2012/0101804 A1 | 4/2012 | Roth |
| 2012/0296835 A1 | 11/2012 | Khan |
| 2013/0282599 A1 | 10/2013 | Kang |
| 2014/0180934 A1 | 6/2014 | Surdeanu |
| 2014/0249801 A1 | 9/2014 | Jackson |
| 2016/0232246 A1 | 8/2016 | Rau |
| 2016/0350886 A1 | 12/2016 | Jessen |
| 2018/0113934 A1 | 4/2018 | Jablonski |
| 2018/0121419 A1 | 5/2018 | Lee |
| 2018/0232361 A1 | 8/2018 | Schick |
| 2018/0329883 A1 | 11/2018 | Leidner |
| 2019/0034416 A1 | 1/2019 | Al Hasan |
| 2019/0057074 A1 * | 2/2019 | Carey ............... G06F 17/248 |
| 2019/0332674 A1 | 10/2019 | Schick |

OTHER PUBLICATIONS

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234.1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/1119303.1119311, abstract, Sections 1-4.

Tseng, Y. H., Lin, C. J., & Lin, Y. I. (2007). Text mining techniques for patent analysis. Information Processing & Management, 43(5), 1216-1247.

* cited by examiner

US 10,747,953 B1

SYSTEMS AND METHODS FOR AUTOMATICALLY CREATING A PATENT APPLICATION BASED ON A CLAIM SET SUCH THAT THE PATENT APPLICATION FOLLOWS A DOCUMENT PLAN INFERRED FROM AN EXAMPLE DOCUMENT

CROSS REFERENCE TO RELATED APPLICATIONS

This application claims the benefit of U.S. Provisional Application No. 62/528,907, filed Jul. 5, 2017 and entitled "SYSTEMS AND METHODS FOR INDUCING PATENT APPLICATION TEMPLATES FROM PATENT CORPORA"; U.S. Provisional Application No. 62/534,793, filed Jul. 20, 2017 and entitled "SYSTEMS AND METHODS FOR PROVIDING DISTINCT VARIATIONS OF PATENT CLAIMS"; U.S. Provisional Application No. 62/539,014, filed Jul. 31, 2017 and entitled "SYSTEMS AND METHODS FOR ENCODING PATENT CLAIMS IN A FORMAT THAT IS BOTH HUMAN-READABLE AND MACHINE-READABLE"; U.S. Provisional Application No. 62/561,876, filed Sep. 22, 2017 and entitled "SYSTEMS AND METHODS FOR AUTOMATICALLY CREATING A PATENT APPLICATION BASED ON A CLAIM SET SUCH THAT THE PATENT APPLICATION FOLLOWS A DOCUMENT PLAN INFERRED FROM AN EXAMPLE DOCUMENT; and U.S. Provisional Application No. 62/564,210, filed Sep. 27, 2017 and entitled "SYSTEMS AND METHODS FOR SUPPLEMENTING CONTENT IN A COMPUTER-GENERATED PATENT APPLICATION BY IDENTIFYING AND EXPANDING ON KEY WORDS AND PHRASES USING NATURAL LANGUAGE GENERATION", all of which are hereby incorporated by reference in their entireties.

FIELD OF THE DISCLOSURE

The present disclosure relates to systems and methods for automatically creating a patent application based on a claim set such that the patent application follows a document plan inferred from an example document.

SUMMARY

One aspect of the present disclosure relates to a system configured for automatically creating a patent application based on a claim set such that the patent application follows a document plan inferred from an example document. The system may include one or more hardware processors configured by machine-readable instructions. The processor(s) may be configured to obtain one or more example documents, a given example document including a patent document. The patent document may include a patent application or an issued patent. The processor(s) may be configured to identify common formatting features among the one or more example documents. The processor(s) may be configured to determine a document plan for a patent application based on information gained from the one or more example documents. The information may include one or more of the common formatting features, the common language, or the generalized alignment between claim features and specification disclosure. The processor(s) may be configured to receive one or more previously unseen patent claims. The one or more previously unseen patent claims may be absent from the previously received patent documents. The processor(s) may be configured to use computerized natural language generation to automatically create a new patent application based on both the document plan and the one or more patent claims such that the new patent application reflects subject matter of the one or more patent claims and is otherwise consistent with the one or more example documents.

Another aspect of the present disclosure relates to a method for automatically creating a patent application based on a claim set such that the patent application follows a document plan inferred from an example document. The method may include obtaining one or more example documents, a given example document including a patent document. The patent document may include a patent application or an issued patent. The method may include identifying common formatting features among the one or more example documents. The method may include determining a document plan for a patent application based on information gained from the one or more example documents. The information may include one or more of the common formatting features, the common language, or the generalized alignment between claim features and specification disclosure. The method may include receiving one or more previously unseen patent claims. The one or more previously unseen patent claims may be absent from the previously received patent documents. The method may include using computerized natural language generation to automatically create a new patent application based on both the document plan and the one or more patent claims such that the new patent application reflects subject matter of the one or more patent claims and is otherwise consistent with the one or more example documents.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
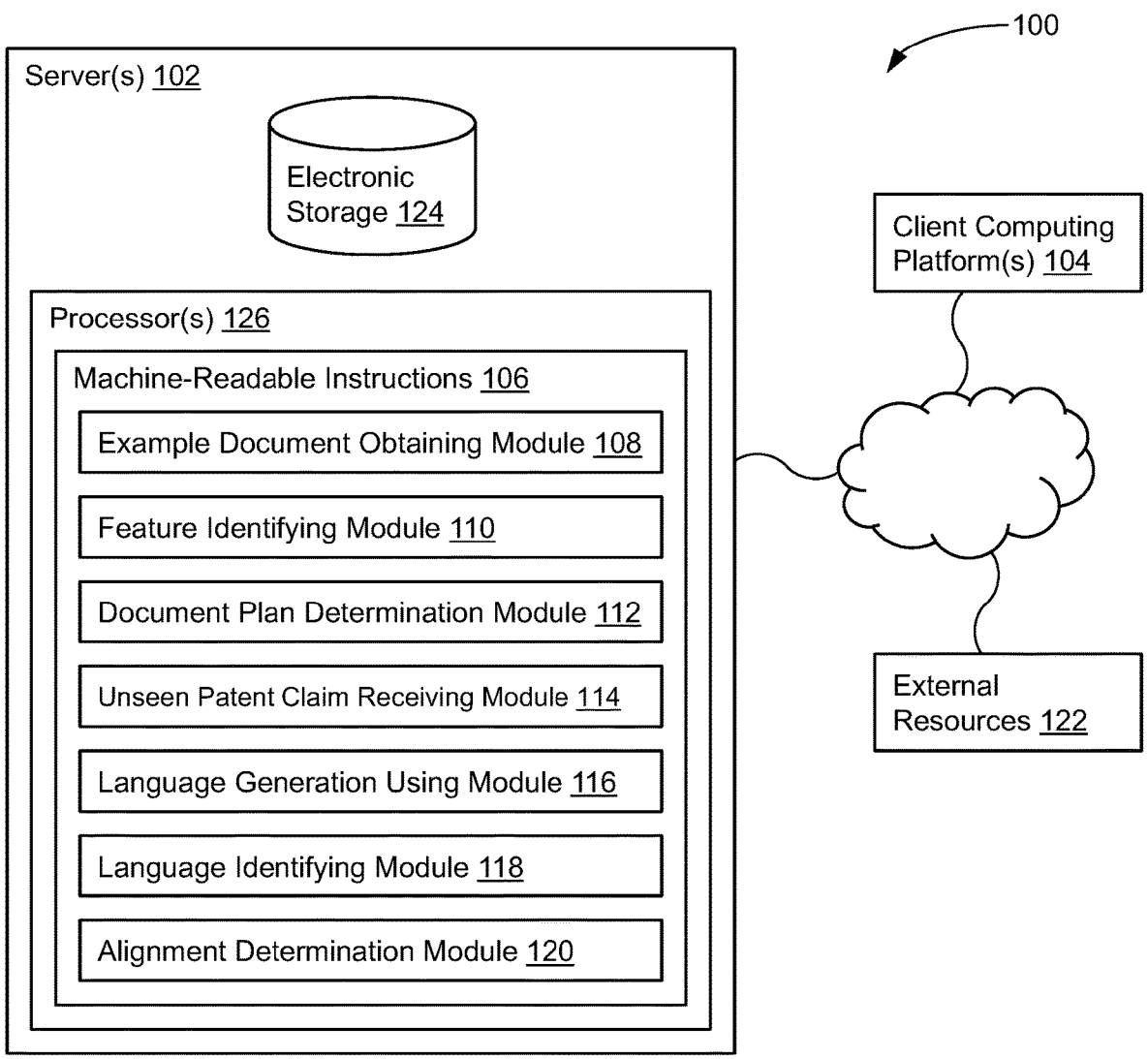
FIG. 1 illustrates a system configured for automatically creating a patent application based on a claim set such that the patent application follows a document plan inferred from an example document, in accordance with one or more implementations.

FIG. 1 illustrates a system 100 configured for automatically creating a patent application based on a claim set such that the patent application follows a document plan inferred from an example document, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of an example document obtaining module 108, a feature identifying module 110, a document plan determination module 112, an unseen patent claim receiving module 114, a language generation using module 116, a language identifying module 118, an alignment determination module 120, and/or other instruction modules.

Example document obtaining module 108 may be configured to obtain one or more example documents, a given example document including a patent document. The patent document may be in the public domain. The patent document may be confidential. The patent document may be encrypted. The one or more example documents may be obtained via email. The one or more example documents may be obtained via a web interface. The one or more example documents may be obtained from a database or document repository. The one or more example documents were drafted by the same individual patent practitioner. The one or more example documents were drafted by the same law firm practice group. The one or more example documents were drafted by the same law firm. The one or more example documents were drafted by the same in-house legal department. The one or more example documents may be associated with the same patent applicant. Responsive to the one or more example documents including three or more example documents. The patent document may include a patent application or an issued patent.

Feature identifying module 110 may be configured to identify common formatting features among the one or more example documents. By way of non-limiting example, the common formatting features may include one or more of font size, font style, line spacing, paragraph numbering style, line numbering style, page numbering style, margin width, claim type, header format, footer format, title format, or section heading format. By way of non-limiting example, claim type may include one or more of composition, method, system, apparatus, device, computer-readable storage medium, or means plus function. The common formatting features may be extracted from the one or more example documents.

Document plan determination module 112 may be configured to determine a document plan for a patent application based on information gained from the one or more example documents. By way of non-limiting example, the document plan may convey one or more of a general document layout, a document format, content of a document, content organization within a document, or surface text of a document. The document plan may include a tree having internal nodes specifying structural information and leaf nodes specifying content. The document plan may be associated with one or more text specifications, a given text specification including trees having internal nodes specifying structure of a text and leaf nodes specifying sentences of a text. By way of non-limiting example, the information may include one or more of the common formatting features, the common language, or the generalized alignment between claim features and specification disclosure.

Unseen patent claim receiving module 114 may be configured to receive one or more previously unseen patent claims. The one or more previously unseen patent claims may be associated with an un-filed patent application. The one or more previously unseen patent claims may be associated with a partially-drafted patent application. The one or more patent claims may be obtained via the same email as the one or more example documents. The one or more previously unseen patent claims may be absent from the previously received patent documents.

Language generation using module 116 may be configured to use computerized natural language generation to automatically create a new patent application based on both the document plan and the one or more patent claims such that the new patent application reflects subject matter of the one or more patent claims and is otherwise consistent with the one or more example documents. The computerized natural language generation may include or is based on a machine learning model. By way of non-limiting example, the machine learning model may include one or more of a statistical classifier, a support-vector machine, bayesian classifier, probabilistic classifier, graph-based propagation algorithm, a recurrent neural network, or a word-vector based classifier. The machine learning model may include a plurality of machine learning models such that individual models vote on possible outputs and the output with the most votes is selected. The machine learning model may be configured to optimize objective functions. Optimizing objective functions may include one or both of maximizing a likelihood of the training set or minimizing a classification error on a held-out set.

Language identifying module 118 may be configured to, responsive to two or more example documents being obtained, identify common language among the two or more example documents. By way of non-limiting example, the common language may include one or more of header text, footer text, boilerplate language, text for section titles, or common disclosure. The common language may be identified by determining a word-level edit distance between pairs of sentences or paragraphs. The common language may be identified by determining a character-level edit distance between pairs of sentences or paragraphs. The common language may be identified based on both word-level edit distance and character-level edit distance.

Alignment determination module 120 may be configured to, responsive to two or more example documents being obtained, determine a generalized alignment between claim features and corresponding disclosure in a specification of the same patent document. The common language may be indicative of static and variable portions of the two or more example documents. The generalized alignment may convey how content of a parsed claim are organized in the specification. The parsed claim may be parse on a feature-by-feature basis. A given feature may include a subject and a predicate.

In some implementations, the claim set may include one or more patent claims. In some implementations, the claim set may be a human-drafted claim set. In some implementations, the claim set may be a computer-generated claim set. In some implementations, the common may format features include formatting features found in a majority of the three or more example documents. In some implementations, the one or more patent claims may be obtained via email. In some implementations, the one or more patent claims may be obtained via a web interface.

In some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute modules 108, 110, 112, 114, 116, 118, 120, and/or other modules. Processor(s) 126 may be configured to execute modules 108, 110, 112, 114, 116, 118, 120, and/or other modules by software; hardware; firmware; some combination of software, hardware, and/or firmware; and/or other mechanisms for configuring processing capabilities on processor(s) 126. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, and 120 are illustrated in FIG. 1 as being implemented within a single processing unit, in implementations in which processor(s) 126 includes multiple processing units, one or more of modules 108, 110, 112, 114, 116, 118, and/or 120 may be implemented remotely from the other modules. The description of the functionality provided by the different modules 108, 110, 112, 114, 116, 118, and/or 120 described below is for illustrative purposes, and is not intended to be limiting, as any of modules 108, 110, 112, 114, 116, 118, and/or 120 may provide more or less functionality than is described. For example, one or more of modules 108, 110, 112, 114, 116, 118, and/or 120 may be eliminated, and some or all of its functionality may be provided by other ones of modules 108, 110, 112, 114, 116, 118, and/or 120. As another example, processor(s) 126 may be configured to execute one or more additional modules that may perform some or all of the functionality attributed below to one of modules 108, 110, 112, 114, 116, 118, and/or 120.

Figure 2:
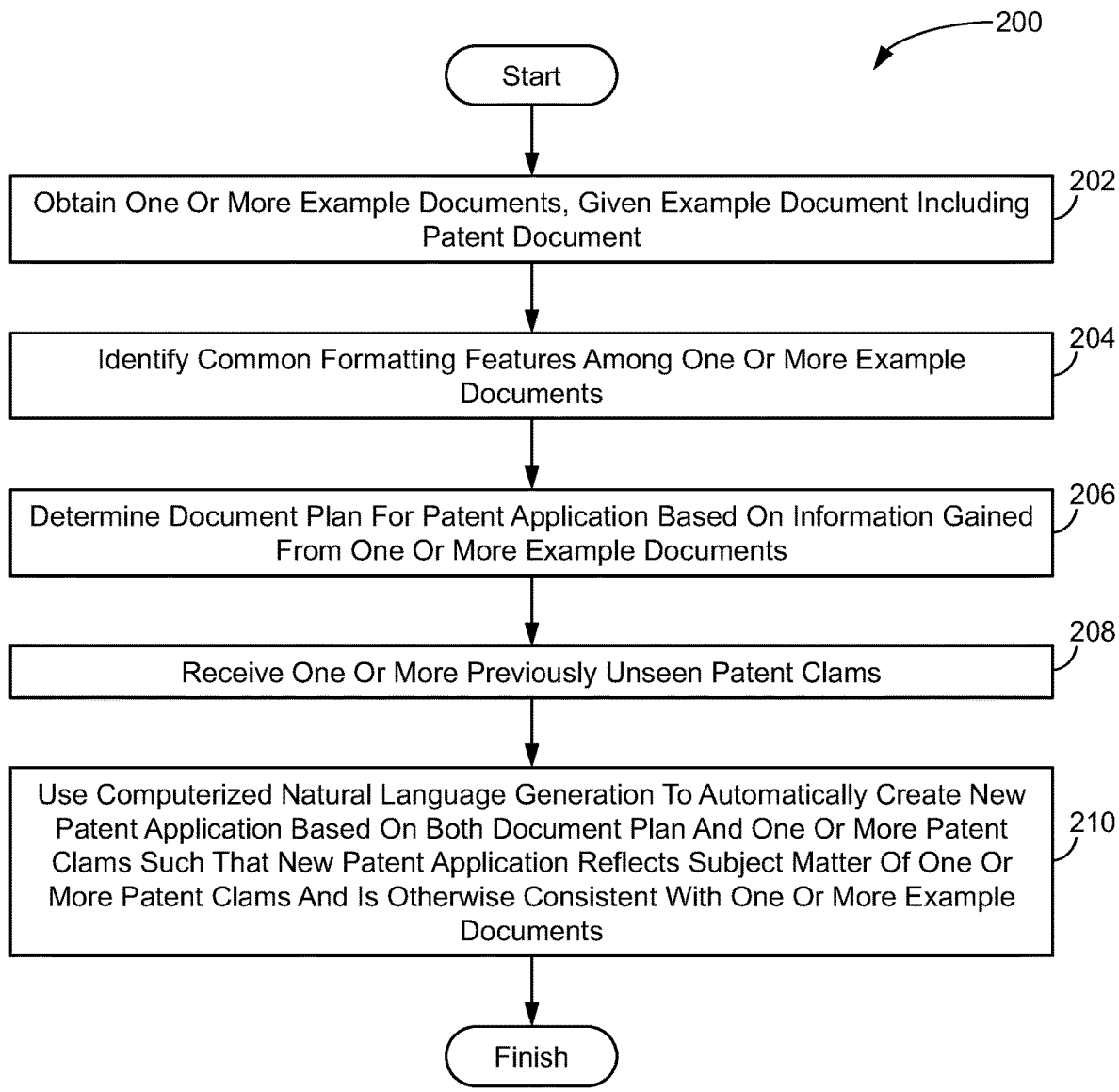
FIG. 2 illustrates a method for automatically creating a patent application based on a claim set such that the patent application follows a document plan inferred from an example document, in accordance with one or more implementations.

FIG. 2 illustrates a method 200 for automatically creating a patent application based on a claim set such that the patent application follows a document plan inferred from an example document, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining one or more example documents, a given example document including a patent document. The patent document may include a patent application or an issued patent. Operation 202 may be performed by one or more hardware processors configured by machine-readable instructions including a module that is the same as or similar to example document obtaining module 108, in accordance with one or more implementations.

An operation 204 may include identifying common formatting features among the one or more example documents. Operation 204 may be performed by one or more hardware processors configured by machine-readable instructions including a module that is the same as or similar to feature identifying module 110, in accordance with one or more implementations.

An operation 206 may include determining a document plan for a patent application based on information gained from the one or more example documents. The information may include one or more of the common formatting features, the common language, or the generalized alignment between claim features and specification disclosure. Operation 206 may be performed by one or more hardware processors configured by machine-readable instructions including a module that is the same as or similar to document plan determination module 112, in accordance with one or more implementations.

An operation 208 may include receiving one or more previously unseen patent claims. The one or more previously unseen patent claims may be absent from the previously received patent documents. Operation 208 may be performed by one or more hardware processors configured by machine-readable instructions including a module that is the same as or similar to unseen patent claim receiving module 114, in accordance with one or more implementations.

An operation 210 may include using computerized natural language generation to automatically create a new patent application based on both the document plan and the one or more patent claims such that the new patent application reflects subject matter of the one or more patent claims and is otherwise consistent with the one or more example documents. Operation 210 may be performed by one or more hardware processors configured by machine-readable instructions including a module that is the same as or similar to language generation using module 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for automatically creating a patent application based on a claim set such that the patent application follows a document plan inferred from example documents, the system comprising:
    one or more hardware processors configured by machine-readable instructions to:
        obtain three or more example documents, a given example document including a patent document, wherein the patent document includes an example patent application or an issued patent;
        identify common formatting features among the three or more example documents, wherein the common formatting features include formatting features found in a majority of the three or more example documents;
        determine a document plan for a patent application based on information gained from the three or more example documents, the information including the common formatting features, common language, and generalized alignment between claim features and specification disclosure;
        receive one or more previously unseen patent claims, the one or more previously unseen patent claims being absent from the three or more example documents; and
        use computerized natural language generation to automatically create a new patent application based on both the document plan and the one or more previously unseen patent claims such that the new patent application reflects subject matter of the one or more previously unseen patent claims and is otherwise consistent with the three or more example documents.

2. The system of claim 1, wherein the common formatting features include one or more of font size, font style, line spacing, paragraph numbering style, line numbering style, page numbering style, margin width, or claim type.

3. The system of claim 1, wherein the common formatting features are extracted from the three or more example documents.

4. The system of claim 1, wherein the one or more hardware processors are further configured by machine-readable instructions to identify the common language among the three or more example documents, wherein the common language includes one or more of header text, footer text, boilerplate language, or common disclosure.

5. The system of claim 4, wherein the common language is indicative of static and variable portions of the three or more example documents.

6. The system of claim 4, wherein the common language is identified by determining a word-level edit distance between pairs of sentences or paragraphs.

7. The system of claim 1, wherein the one or more hardware processors are further configured by machine-readable instructions to determine the generalized alignment between claim features and corresponding disclosure in a specification of a same patent document, wherein the generalized alignment conveys how content of a parsed claim are organized in the specification.

8. The system of claim 1, wherein the document plan conveys one or more of a general document layout, a document format, content of a document, content organization within a document, or surface text of a document.

9. The system of claim 1, wherein the one or more previously unseen patent claims are obtained via a same email as the three or more example documents.

10. A method to automatically create a patent application based on a claim set such that the patent application follows a document plan inferred from example documents, the method comprising:
    obtaining three or more example documents, a given example document including a patent document, wherein the patent document includes an example patent application or an issued patent;

identifying common formatting features among the three or more example documents, wherein the common formatting features include formatting features found in a majority of the three or more example documents;

determining a document plan for a patent application based on information gained from the three or more example documents, the information including the common formatting features, common language, and generalized alignment between claim features and specification disclosure;

receiving one or more previously unseen patent claims, the one or more previously unseen patent claims being absent from the three or more example documents; and using computerized natural language generation to automatically create a new patent application based on both the document plan and the one or more previously unseen patent claims such that the new patent application reflects subject matter of the one or more previously unseen patent claims and is otherwise consistent with the three or more example documents.

11. The method of claim 10, wherein the common formatting features include one or more of font size, font style, line spacing, paragraph numbering style, line numbering style, page numbering style, margin width, or claim type.

12. The method of claim 10, wherein the common formatting features are extracted from the three or more example documents.

13. The method of claim 10, further comprising identifying the common language among the three or more example documents, wherein the common language includes one or more of header text, footer text, boilerplate language, or common disclosure.

14. The method of claim 13, wherein the common language is indicative of static and variable portions of the three or more example documents.

15. The method of claim 13, wherein the common language is identified by determining a word-level edit distance between pairs of sentences or paragraphs.

16. The method of claim 10, further comprising determining the generalized alignment between claim features and corresponding disclosure in a specification of a same patent document, wherein the generalized alignment conveys how content of a parsed claim are organized in the specification.

17. The method of claim 10, wherein the document plan conveys one or more of a general document layout, a document format, content of a document, content organization within a document, or surface text of a document.

18. The method of claim 10, wherein the one or more previously unseen patent claims are obtained via a same email as the three or more example documents.

\* \* \* \* \*